United States Patent [19]

Gunti

[11] 4,172,677
[45] Oct. 30, 1979

[54] VARIABLE LOAD-BEARING FRAMEWORK
[75] Inventor: Rolf Gunti, Laufen, Switzerland
[73] Assignee: Masyc AG, Laufen, Switzerland
[21] Appl. No.: 827,213
[22] Filed: Aug. 24, 1977

Related U.S. Application Data

[62] Division of Ser. No. 608,399, Aug. 27, 1975, Pat. No. 4,056,180.

[30] Foreign Application Priority Data

Aug. 27, 1974 [CH] Switzerland ............ 11677/74

[51] Int. Cl.$^2$ .................................. F16B 7/00
[52] U.S. Cl. ........................ 403/189; 52/732; 403/406
[58] Field of Search ........... 403/110, 189, 406; 193/35 R, 35 J, 35 TE; 52/726, 729, 730, 731, 732

[56] References Cited

U.S. PATENT DOCUMENTS

| | | | |
|---|---|---|---|
| 2,304,126 | 12/1942 | Skeel | 403/406 |
| 3,332,197 | 7/1967 | Hinkle | 52/732 X |
| 3,509,669 | 5/1970 | Plemeng | 52/729 X |
| 3,890,755 | 6/1975 | Specht | 193/35 R |
| 4,002,000 | 1/1977 | Howard et al. | 52/729 |
| 4,056,180 | 11/1977 | Gunti | 193/35 R X |

*Primary Examiner*—Wayne L. Shedd
*Attorney, Agent, or Firm*—Anthony J. Casella

[57] ABSTRACT

A set of components for producing load-bearing scaffolds comprising profile bars and connecting bars each having an approximately Σ-shaped cross-section with a flat center web section. The connecting bars fit slidably in the profile bars to which they are attached by connecting means through perforations in each of the center web sections. The profile bars also have an inwardly angled free arm extending parallel to the center web section and having perforations to provide for connection of further components to the profile bars. Further components adapted for use with the above profile bars comprise fixing angles, packing pieces, cross-member brackets, reducing elements, bearing hole plates, angle elements and belt guide plates.

7 Claims, 35 Drawing Figures

VARIABLE LOAD-BEARING FRAMEWORK

This is a division of application Ser. No. 608,399 filed Aug. 27, 1975, now U.S. Pat. No. 4,056,180.

The invention relates to a set of components for producing variable load-bearing scaffolds which are useful more particularly for conveyor apparatus such as large and small roller trains, continuous shelves for belt conveyor installations, with profile bars exhibiting perforations at regular intervals which are mutually detachably connectable by bolts, screws or axles.

In the design of load-bearing scaffolds for large and small roller trains, continuous shelves and belt conveyor installations, great adaptability and suitability for conversion with a small outlay of labour and materials are relevant desiderata.

The previous procedure for producing a large or small roller train is, for example, that two generally customary commercial profile girders to be arranged on both sides of the train are mounted on profile columns and screwed or welded together or connected by fishplates. The axles of the large or small rollers are fitted between the profile girders, for which purpose holes are drilled in the webs of the profile girders. Such a train or track has to be completely redesigned for each individual application and cannot subsequently be modified without a considerable outlay.

The aim of the invention is to develop a set of components of the type initially defined, which in conjunction with a few individual parts which can be produced cheaply, makes possible the greatest variety of possibilities for the conformation of load-bearing scaffolds, more particularly for conveyor apparatus, so that with this set of components practically any desired structural form can be produced easily and simply and can likewise be modified subsequently with a small outlay of labour, whereas a greater variety of possible combinations of the individual elements is obtained in conjunction with fewer parts.

The above-defined aim is achieved according to the invention in that the profile bars exhibit an approximately sigma-shaped cross-section with straight centre web section and two equally dimensioned flanges arranged in mirror image relationship, that the perforations of the profile bars are provided in the centre web section and in an inwardly angled free arm of each flange extending parallel to the centre web section of the profile bars, that connecting bars are provided, the cross-section of which is geometrically approximately similar to that of the profile bars and exhibits such dimensions that a connecting bar is insertible into a profile bar with engaging and fitting flanges and mutually superposed centre web section and is slidable telescopically therein and that the perforations are provided in the centre web section of the connecting bars.

According to a further development of the invention, it is provided that the flanges of the profile bars exhibit a U-shaped, and those of the connecting bars an approximately L-shaped cross-sectional shape, between the connecting arms and the parallel offset centre web element of which oblique web sections creating the approximately sigma-shaped cross-section are arranged, so that preferably the external dimensions of the L-shaped flanges of the connecting bars are adapted to the internal dimensions of the U-shaped flanges on the profile bars so that in the case of a connecting bar inserted into a profile bar the L-shaped flanges are accommodated with a sliding fit into the U-shaped flange and the adjacent centre web sections and oblique web sections are mutually in contact.

Also preferably, the U-arms and the U-bridge of the flanges of the profile bars are of equal length and thus form three sides of a square, whilst advantageously the connecting arms of the U-shaped flanges of the profile bars exhibit approximately the same width as their central web section and preferably the oblique web sections enclose an angle between 30° and 60°, preferably 45°, with the centre web section and with the connecting arms of the flanges respectively.

In further advantageous manner, the connecting bars may exhibit short marginal webs directed inwards towards each other on the free edges of their mutually parallel oriented base arms of the L-shaped flanges.

The centre web section of the profile bars preferably extends centrally between the U-arms of the flanges.

The perforations are advantageously polygonal holes.

According to a further development of the invention fixing angles are provided, each of which exhibits two identical angle plates arranged mutually at right angles, which are insertible aligned both with their median longitudinal and also with their median transverse line in the direction of the longitudinal line of the profile bars to fit into the latter between their centre web section and the free arms of the U-flanges, whilst advantageously at each of the two corners on the bend line between the angle plates an insertion aperture is provided so that an angle plate when inserted into the space between the centre web section and free arms of a profile bar is first of all slidable by one edge more deeply behind a free arm and then slidable with the opposite edge behind the opposite free arm.

This further development is characterised in that a slot is made in each angle plate extending on its median line at right angles to the other angle plate, that two elongate transverse holes start at right angles from the slot, of which the length and distance between their centre lines is equal to the distance between two perforations in the profile bars and which conjointly with the slot form a U-shape, while the slot extends slightly beyond each transverse hole, whilst advantageously a second slot is provided staggered parallel to the first slot.

In another further development of the invention, packing pieces constructed in the shape of an elongate rectangle in plan are provided which exhibit a trapezoidal cross-section, of which the minor base surface exhibits a width equal to the width of the centre web section and its oblique faces exhibit a width and an angle equal to the width and to the angle respectively of the oblique web sections of the bars.

Again preferably, column head pieces are provided, each of which exhibit in a fixing flange a perforation and two locking cams staggered laterally at the distance of the perforations in the profile bars, the external circumference of which is adapted to the internal circumference of the perforations for a sliding fit, whilst each column head piece exhibits in a connecting flange a slot extending at right angles to the connecting line of the locking cams in the fixing flange, and on its side remote from the fixing flange an arcuate slot, the radius of curvature of which to a point in the slot is equal to the distance between two perforations.

In the case of this further development, the fixing flange and the connecting flange may advantageously be arranged staggered by an angle piece so that in the case of a fixing flange in contact with the centre web section of a profile bar on its inside the connecting flange is in contact with the outside of the free U-arm of a U-flange of said profile bar.

Furthermore, according to a further development of the invention crossmember brackets are provided, each of which exhibits a hole plate introducible to fit into the interior of a profile bar and having three fixing holes which have a distance from one another equal to that of the three rows of perforations of the profile bars, whilst preferably in the region of the central fixing hole of the crossmember brackets there projects a guide cam which is staggered laterally in the direction of the connecting line between the fixing holes, grips round the central fixing hole with a semicircular aperture and exhibits external dimensions which corresponds to the internal dimensions of the crossmembers used, and the crossmember brackets form a double T-shape in plan, that in the two end sections of each of the two T-beams semicircular apertures are provided which are located at the distance of the perforations from the associated fixing hole and that the edges of the T-beams directed outwards away from each other are rounded in the region of the semicircular apertures.

Moreover, advantageously reducing parts are provided for supporting the axles of small rollers or light support rollers in a perforation of the bars, each of which exhibits a fixing stud insertible releasably, more particularly catchingly, into a perforation and at least one bearing ring of reduced cross-section, whilst preferably each reducing element exhibits a bearing plate H-shaped in plan having two triquadrant-shaped bearing section rings and that the fixing stud is arranged laterally staggered above one of the two bearing section rings and exhibits an external circumference insertible as a snug fit into a polygonal perforation and the arms of the bearing section rings are flexible elastically apart and that the fixing stud exhibits a widened retaining head subdivided in the centre by at least one slot, the head sections of which are compressible elastically together for passage through a perforation.

Again, preferably bearing hole plates are provided for supporting rollers of different envelope diameter, each of which exhibits a hole plate element attachable to the inside of the centre web section of the connecting bars, in which about a fixing slot a series of bearing perforations are provided which are arranged at different distances from the fixing slot and thereby permit different bearing heights, whilst in a further development the bearing hole plates exhibit a connecting flange serving for the attachment of a column head piece, which is staggered by an angle piece with respect to the hole plate element so that in the case of a hole plate element in contact with the centre web section of a connecting bar on its inside the connecting flange is in contact with the outside of the short marginal web of an L-flange of said connecting bar and a slot for attaching a column head piece, and parallel to said slot a series of perforations for retaining crossmembers, are arranged in the connecting flange.

Further advantageously, angle elements are provided, each of which exhibits a hole plate with three series of perforations which correspond to the three series of perforations in the profile bars in the mutual distance of the series and of the perforations, and a connecting plate arranged at a predetermined angle to the hole plate, whilst a slot is made in the median of the three series of perforations of the hole plate and the connecting plate exhibits a raised centre web on the side remote from the hole plate, and an oblique surface on each side of said web, and is thereby placeable to fit against the centre web section and the oblique web sections of the bars, and that a slot is made in the centre web of the connecting plate.

Lastly, advantageously belt guide plates are provided which are mountable on profile bars inserted transversely between two longitudinally extending profile bars by means of fixing angles and form a smooth sliding surface for a conveyor belt.

The solution of the problem according to the invention presents the following advantages. Both the profile bars and the connecting bars exhibit on their outwardly oriented side a smooth closed surface in which the series or row of perforations provided in the centre web section is offset inwards within the outer margins of the bars. Nevertheless the profile bars exhibit on their inside, where the necessity for them exists, three rows of orifices extending mutually parallel. The profile bars can be connected together without forming a transition gap—i.e., practically jolt-free, by sliding in a piece of a connecting bar. The sigma-shaped cross-section of the profile bars and connecting bars ensures an optimum joint rigidity and load-bearing capacity and simultaneously makes it possible for all screws or projecting axle ends which are fixed in the median row of perforations to be arranged internally positioned with reference to the external periphery of the profile bars, whereby the risk of injuries and accidents when people are working directly at a scaffold is eliminated.

The connecting bars, by virtue of the L-shape of their flanges, can easily be bent at right angles to their main plane and are therefore particularly suitable for the construction of curved tracks. The necessary joint rigidity and load-bearing capacity is ensured at the same time by the short marginal webs.

The fixing angles permit the connection of profile bars and connecting bars arranged at the widest variety of different angles to one another, and are suitable for an end closure or the connection of crossmembers formed by means of identical profile bars and also for the fixing of columns. The number of possible applications of the fixing angle is considerably increased by the packing piece provided. The packing piece further makes possible a connection between two parts with an optimally wide thrust transfer surface.

The column head piece makes possible a rapid connection of a column to a profile bar in a simple manner, whilst due to the locking cams provided the number of work stages is reduced, because a column head piece can be connected integrally in rotation to a profile bar by means of a single screw.

The crossmember bracket permits a rigid joint construction, while due to the staggered arrangement of the guide cam the crossmember can be arranged staggered upwards or downwards with reference to the existing rollers in a simple manner as a function of the existing conditions. The conditions for the arrangement of cross-members are very variable, depending on whether small rollers with a close interval, large rollers with a close interval, or driven rollers are required to be mounted.

The reducing element according to the invention makes it possible to mount axles with smaller diameters, although the profile bars and connecting bars are equipped with relatively large polygonal holes. The asymmetrical arrangement of the fixing head with respect to the bearing ring then makes it possible to arrange such axles or rollers at three different heights with respect to the rows of perforations in the profile bars. The reducing elements furthermore permit a rapid and simple mode of assembly by snap-in fastening.

The bearing hole plates make it possible to mount rollers with a different envelope diameter or also conical rollers so that their work surface lies above the profile bars in a uniform transport plane, although preperforated profile bars or connecting bars preperforated in curves serve as support elements. In this case the bearing hole plate with offset connecting flange makes it possible to provide columns in curves in a fast and simple manner.

The angle element is more particularly suited for constructing track points with the profile bars provided, in which case the angle elements either maintain two profile bars at a prescribed mutual angle or else can be fitted to a profile bar for the mounting of transport rollers which are mounted at their other end in a profile bar arranged at an angle. The assembly of the angle elements is very simple in these cases, because it need only be placed with its connecting flange against the centre web section of a profile bar or connecting bar and be attached by a single screw.

The invention is explained in exemplary manner hereinbelow with reference to the accompanying drawing, wherein:

FIG. 1a shows a perspective view of a section of a profile bar and with a section of a connecting bar from their outside, the possibility of sliding into one another being indicated by dash lines.

FIG. 21 shows a plan of a section of a points in a roller train, in which the angle elements illustrated in FIGS. 20–20b are used.

Figures 1, 2:
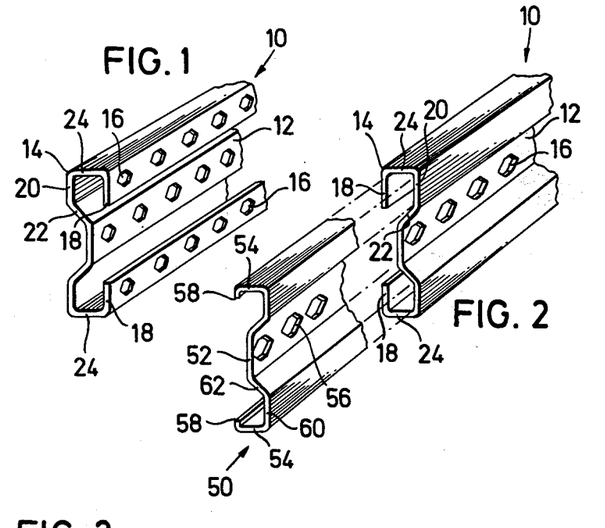
FIG. 1 shows a perspective view of a section of a profile bar from its inside.

As the drawing shows, a profile bar 10 is provided which exhibits a cross-section similar to the Greek letter sigma, in which a straight centre web section 12 and two equally dimensioned flanges 14 arranged in mirror image symmetry are provided. The centre web section 12 is connected to the flanges 14 by oblique web sections 22 which create the approximately sigma-shaped cross-section. The flanges 14 are of U-shaped construction, while one arm is connected as connecting arm 20 to the adjacent oblique web section 22 and a U-bridge 24 leads to a free arm 18. A row of perforations 16 arranged at regular intervals is provided both in the centre web section 12 and also in each free arm 18 of the profile bars 10.

According to FIG. 2 connecting bars 50 are provided, the cross-section of which is geometrically somewhat similar to that of the profile bars 10. Each connecting bar 50 likewise exhibits a centre web section 52 and two equally dimensioned flanges 54 arranged in mirror image symmetry. However in the case of the connecting bars 50 the flanges 54 are of L-shaped cross-sectional construction, in which the connecting arm 60 of each L-flange is likewise connected by an oblique web section 62 to the centre web section 52. The base arm 64 of each L-flange of the connecting bars 50 exhibits a short marginal web 58 extending parallel to the connecting arm 60 at its edge remote from the connecting arm 60. In the connecting bars the perforations 56 arranged at regular intervals are provided only in the centre web section 52.

The external dimensions of the L-shaped flanges 54 of the connecting bars 50 are adapted to the internal dimensions of the U-shaped flanges 14 on the profile bars 10 so that in the case of a connecting bar 50 inserted into a profile bar 10 the L-shaped flanges 54 are accommodated with a sliding fit into the U-shaped flange 14 and the adjacent centre web sections 12, 52 and oblique web sections 22, 62 are mutually in contact.

The U-arms 18, 20 and the U-bridge 24 of the flanges 14 of the profile bars 10 are of equal length and thus form three sides of a square. Furthermore the U-arms of the U-flanges 14 of the profile bars 10 exhibit approximately the same width as their centre web section 12.

The oblique web sections 22 and 62 of the profile bars 10 and connecting bars 50 enclose an angle of 45° with the associated centre web section 12 or 52 respectively.

In the profile bars 10 the centre web section 12 lies in the plane extending centrally between the U-arms 18, 20 of the U-flanges 14.

In the embodiment illustrated the perforations 16, 56 are hexagonal holes.

According to FIGS. 3–7 and 11 fixing angles are provided, each of which exhibits two identical angle plates 32 arranged mutually at right angles, which are insertible aligned both with their median longitudinal and also with their median transverse line in the direction of the longitudinal line of the profile bars 10 to fit into the latter between their centre web section 12 and the free arms 18 of the U-flanges 14. In each of the two corners located on the bend line between the angle plates 32 there is provided an insertion aperture 34, 35, the insertion aperture 35 being made deeper than the insertion aperture 34. It is thereby possible, when an angle plate 32 is inserted into the space between the centre web section 12 and free arm 18 of a profile bar 10, first of all to slide it in deeper with one edge behind a free arm 18 and then to press it with the opposite edge behind the opposite free arm 18 and again to slide it forward slightly.

Figure 3:
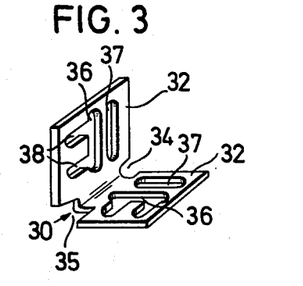
FIG. 3 shows a perspective view of a fixing angle.
Figure 3A:
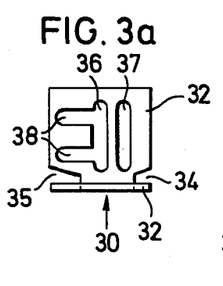
FIG. 3a shows an elevation of a fixing angle.
Figure 3B:
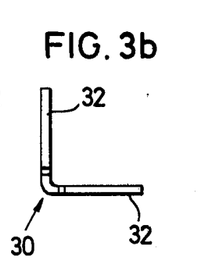
FIG. 3b shows a side elevation of a fixing angle.
Figure 4:
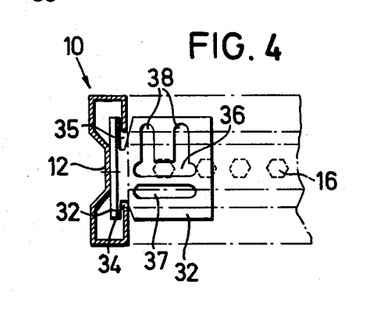
FIGS. 4 and 5 show possibilities of practical use for the fixing angle.
Figure 5:
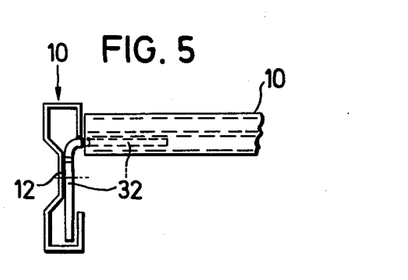

According to FIGS. 3–5, a first slot 36 is made in each angle plate 32 on its centre line extending at right angles to the other angle plate 32, whilst two elongate transverse holes 38 start at right angles from the first slot 36. The length of the transverse holes 38 and the distance between their centre lines are equal to the distance between two perforations 16 in the profile bars 10. The first slot 36 and the transverse holes 38 together form a U-shape, while the slot 36 extends slightly beyond each transverse hole 38. Lastly a further second slot 37 is provided offset parallel to the first slot 36.

Figures 6, 7, 8:
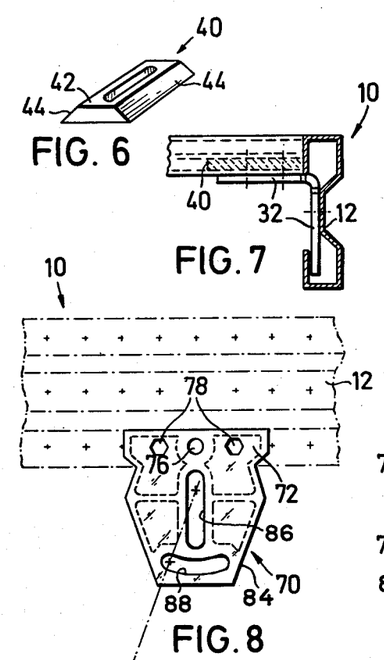
FIG. 6 shows a perspective view of a packing piece.
FIGS. 7 and 7a show possible practical uses for the fixing angle in conjunction with the packing piece.
FIG. 8 shows a plan of a column head piece.
Figure 7A:
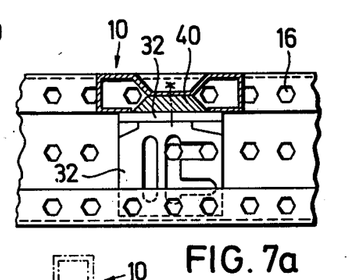

FIGS. 6–7a show a packing piece 40, which exhibits in plan the shape of an elongate rectangle, and in cross-section a trapezoidal shape. The minor base surface 42 of the trapezoidal shape exhibits a width equal to the width of the centre web section 12, 52 of the profile bars 10 and connecting bars 50, whilst the oblique faces 44 are arranged at the same angle as the oblique web sections 22, 62 of the profile bars 10 and connecting bars 50 and exhibit the same width as these oblique web sections.

Figure 8A:
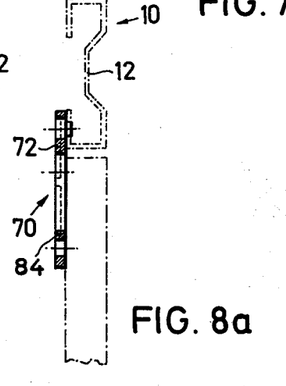
FIG. 8a shows a side elevation to FIG. 8.
Figure 9:
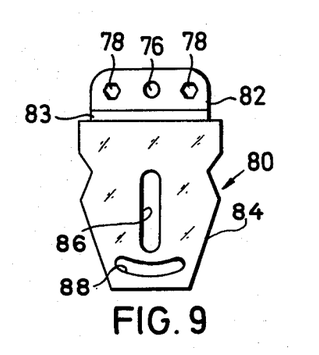
FIG. 9 shows an elevation of another form of construction of the column head piece.
Figure 9A:
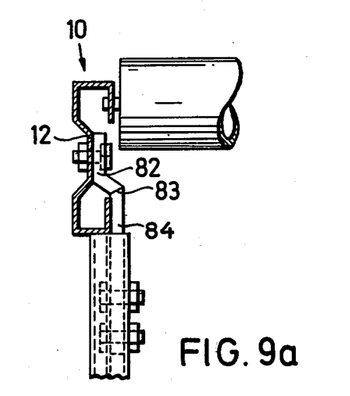
FIG. 9a shows a side elevation to FIG. 9, showing in addition a column, a profile bar and a roller.

FIGS. 8–9a illustrate two embodiments of a column head section 70 and 80 respectively. In each embodiment, a fixing flange 72 or 82 is provided which exhibits a perforation 76 and two locking cams 78 offset laterally at the distance of the perforations 16 of the profile bars 10. The external periphery of each locking cam 78 is adapted for a sliding fit to the internal periphery of the perforations 16 of the profile bars 10. Each column head piece 70 or 80 also exhibits in a connecting flange 84 a slot 86 extending at right angles to the connecting line of the locking lugs 78 in the fixing flange 72 or 82, and an arcuate slot 88 on its side remote from the fixing flange 72 or 82. The radius of curvature of the arcuate slot 88 to a point in the slot 86 is equal to the distance between two perforations in the profile bars 10. In the embodiments illustrated in FIGS. 8, 8a, the fixing flange 72 and the connecting flange 84 of the column head piece 70 lie in a common plane, whereas in the case of the embodiment illustrated in FIGS. 9, 9a, the fixing flange 82 and the connecting flange 84 are arranged staggered into different planes by an angle piece 83. The staggering is provided so that, in the case of a fixing flange 82 in contact with the centre web section 12 of a profile bar 10 on its inside, the connecting flange 84 is in contact with the outside of the free U-arm 18 of a U-flange 14 of said profile bar 10.

Figures 10, 10A, 10B, 10C:
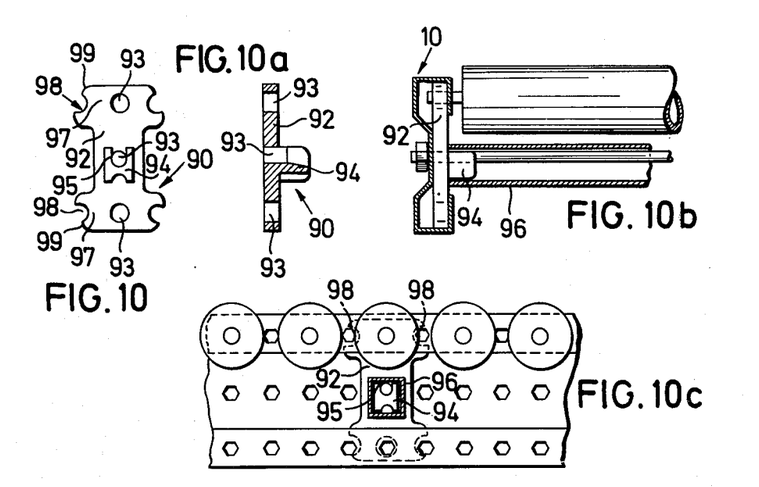
FIG. 10 shows a plan of a crossmember bracket.
FIG. 10a shows a sectional side elevation of FIG. 10.
FIG. 10b shows a side elevation of the crossmember bracket illustrated in FIG. 10 with a profile bar, a crossmember and a roller.
FIG. 10c shows a plan of a crossmember bracket inserted into a profile bar.
Figure 11:
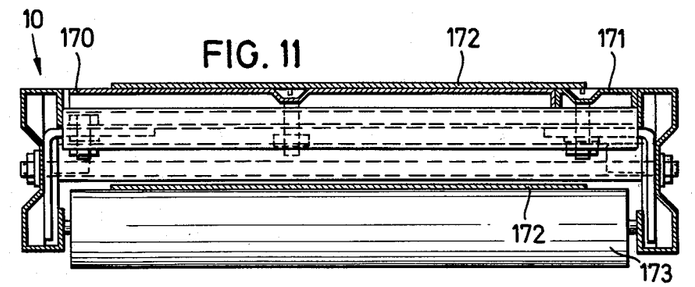
FIG. 11 shows a cross-section through a belt conveyor installation with a belt conveyor plate.

A crossmember bracket 90, illustrated in FIGS. 10–10c, exhibits a hole plate 92 which can be introduced to fit into the interior of a profile bar 10. The hole plate 92 is provided with three fixing holes 93 which have a mutual distance equal to that of the three rows of perforations 16 in the profile bars 10. An essential feature of the crossmember bracket is a guide cam 94 in the region of the central fixing hole 93, which is staggered laterally towards the connecting line between the fixing holes 93, grips round the central fixing hole 93 with a semicircular aperture 95 and exhibits external dimensions which conform to the internal dimensions of the cross-member 96 illustrated. Due to the lateral staggering of the guide cam it is possible to stagger the crossmember 96 upwards or downwards with reference to mounted rollers.

According to FIG. 10 the crossmember bracket 90 forms in plan approximately a double T-shape or an I-shape, while in each of the two end sections of each of the two T-beams 97 there is provided a semicircular aperture 98 which lie at the distance of the perforations 16 in the profile bars 10 from the associated fixing hole 93. The edges 99 located on the top side of the upper T-beam and on the underside of the lower T-beam 97 in the region of the semicircular aperture 98 are rounded. Due to this rounding it is possible to insert a crossmember bracket rotated into the interior of a profile bar 10 and to rotate it into the correct position therein. Furthermore, by virtue of the semicircular construction of the apertures 98, it is possible to insert the crossmember bracket into the interior of a profile bar 10, in the perforations of which axles are already mounted.

FIG. 10 illustrates a section of a belt conveyor installation. Two profile bars 10 oriented mutually parallel support by means of fixing angles and of transversely arranged profile bar sections a wider belt guide plate 170 and a narrower belt guide plate 171. The underside of a conveyor belt 172 is guided on the top side of the belt guide plate 170, 171, whilst its lower side extends beneath the crossmember over a support roller 173.

Figures 12, 12A:
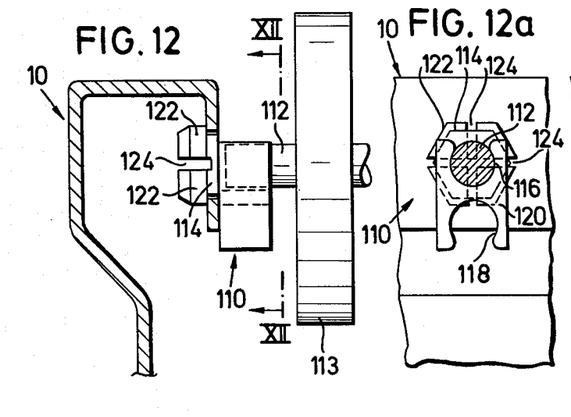
FIG. 12 shows a reducing element inserted into a flange of a profile bar, and in which the axle of a roller is mounted.
FIG. 12a shows a view along the line XII—XII in FIG. 12.
Figure 12B:
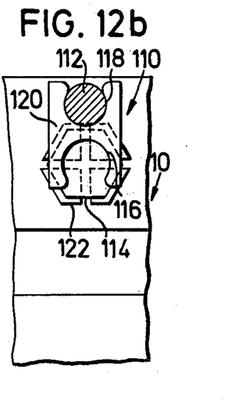
FIG. 12b shows a view similar to FIG. 12a, in which the reducing element has been inserted rotated through 180° and the axle mounted staggered.
Figure 13:
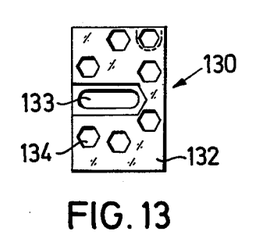
FIG. 13 shows a plan of a bearing hole plate.
Figure 13A:
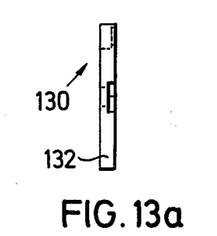
FIG. 13a shows a side elevation to FIG. 13.
Figure 14:
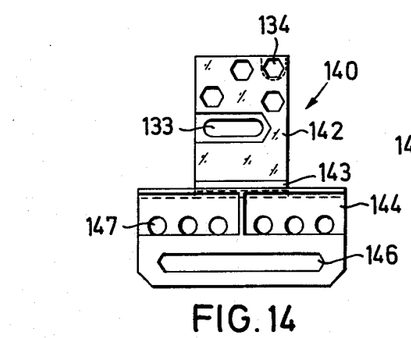
FIG. 14 shows a plan of another form of construction of the bearing hole plate.
Figure 14A:
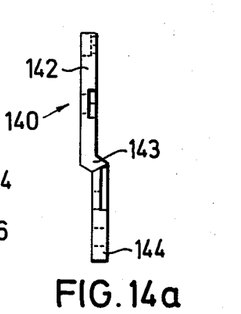
FIG. 14a shows a side elevation to FIG. 14.

A reducing element 110 is illustrated in FIGS. 12, 12a and 12b. The reducing element 110 exhibits a bearing plate 120 of H-shaped plan having two triquadrant-shaped bearing section rings 116, 118 directed mutually oppositely, whilst a fixing stud 114 is arranged laterally staggered above the bearing section ring 116. The fixing stud 114 exhibits an outer circumference by which it is insertible as a snug fit into one of the hexagonal perforations 16 or 56. The bearing section ring 118 staggered laterally with reference to the fixing stud 114 can thus be arranged in six different alignments with reference to a perforation 16 or 56. The bearing section ring 118 is therefore shown staggered downwards in FIG. 12a and staggered upwards in FIG. 12b with reference to the perforation 16 of the profile bar 10. An axle 112 which supports a roller 113 is shown mounted in the bearing section ring 116 which is aligned with the perforation in FIGS. 12 and 12a, and mounted in the staggered bearing section ring 118 in FIG. 12b. The fixing stud 114 exhibits a widened anchorage head 122 which is subdivided by two slots 124 oriented mutually at right angles into four head sections which are compressible elastically together for the purpose of passage through a perforation 16 or 56.

Two embodiments of a bearing hole plate are illustrated in FIGS. 13–19. Both the bearing hole plates 130, 140 illustrated exhibit a hole plate element 132 or 142 which is attachable on the inside of the centre web section 52 of the connecting bars 50 and in which, around a fixing slot 133, there are provided a row of bearing perforations which are arranged at different intervals—considered at right angles to the longitudinal line of the fixing slot 133—and thus permit rollers with different envelope diameters, more particularly conical rollers, to be arranged with their support surface in a common conveyor plane.

Figure 15:
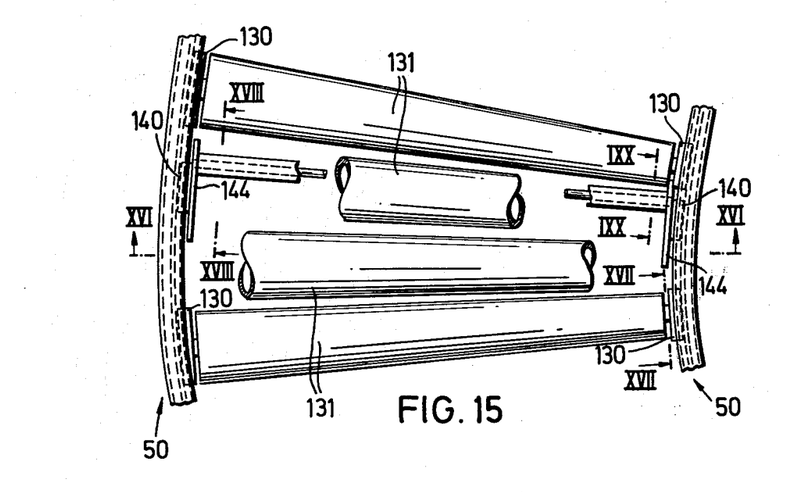
FIG. 15 shows a section of a curved track in which bearing hole plates according to FIGS. 13–14 are used.
Figure 16:
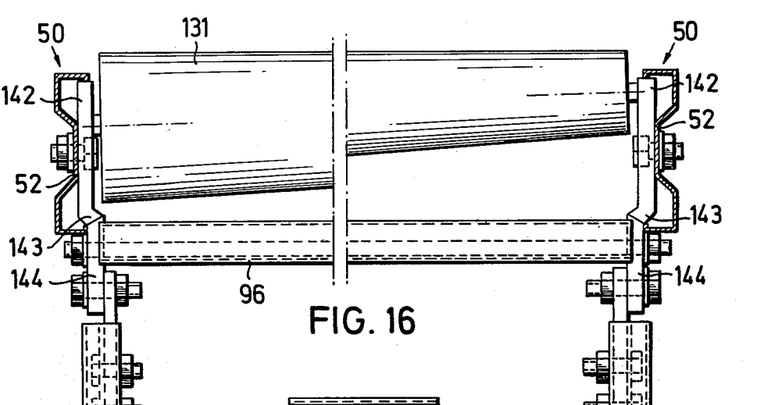
FIG. 16 shows a section made along the line XVI—XVI in FIG. 15.
Figure 17:
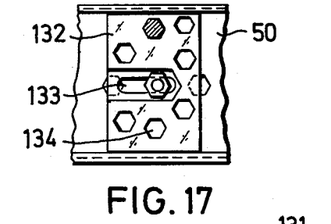
FIG. 17 shows a section made along the line XVII—XVII in FIG. 15.
Figure 18:
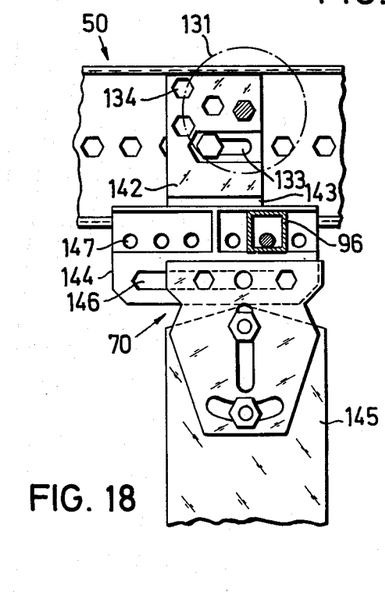
FIG. 18 shows a section made along the line XVIII—XVIII in FIG. 15.
Figure 19:
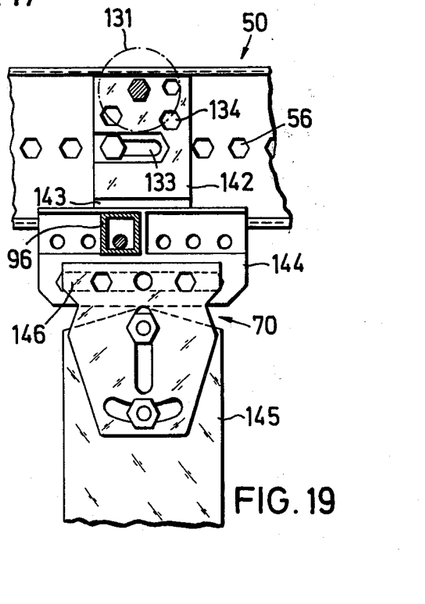
FIG. 19 shows a section made along the line XIX—XIX in FIG. 15, FIGS. 20, 20a and 20b show various views of an angle element

The bearing hole plate 140 illustrated in FIGS. 14–16, 18 and 19 further exhibits a connecting flange 144 which is provided with a slot 146 for attachment to a column head piece 70 and with a row of perforations 147 for retaining crossmembers 96, which is arranged parallel to the slot 146. The connecting flange 144 is staggered with respect to the hole plate element 142 by an angle piece 143, so that the connecting flange 144 passes the L-flange in the case of a bearing hole plate 140 attached to a connecting bar 50. The bearing hole plate 140 with connecting flange 144 serves to connect columns to the connecting bars used in curves, and for this purpose it is used alternately with the bearing hole plate 130, as illustrated in FIG. 15. FIGS. 18 and 19 show how a column head piece 70 is attached to the connecting flange 144 of the bearing hole plate 140 and itself supports a column 145.

Figures 20, 20A, 20B, 21:
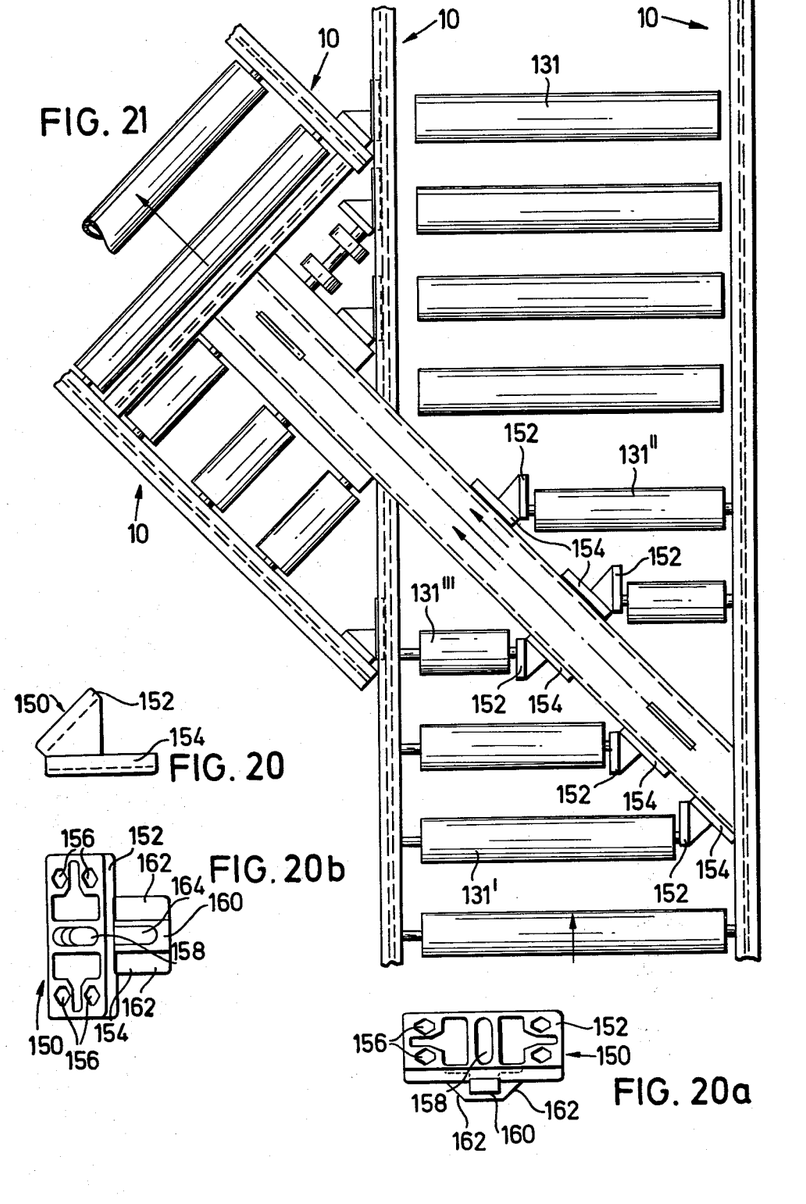

According to FIGS. 20–21 an angle element 150 is provided which exhibits a hole plate 152 and a connecting plate 154 arranged at a predetermined angle thereto. Three rows of perforations 156, 158 are provided in the hole plate 152, which conform in their interval to the three rows of perforations 16 in the profile bars 10. In the median of the three rows of perforations, a slot 158 is made in the hole plate 152, so that the angle element 150 can be steplessly staggered when attached to a profile bar or angle bar. The connecting plate 154 exhibits on its side remote from the hole plate 152 a raised centre web 160, and on each side of said centre web 160 an oblique surface 162, while the centre web 160 and the oblique surface 162 are dimensioned so that they can be placed to fit against the centre web section 12, 52 and the oblique web sections 22 and 62 respectively of the profile bars 10 and connecting bars 50. A slot 164 is likewise made in the centre web section 160 of the connecting plate 154, to enable the connecting plate 154 and a profile bar to be staggered steplessly with respect to one another.

What is claimed is:

1. The combination of a set of components for forming a load-bearing framework comprising approximately Σ-shaped bars, each of which has a flat center web section being provided with perforations for receiving connecting means, oblique web sections enclosing an angle between 120° and 150° with the ends of said flat center web section and connecting arms of U-shaped flanges, the bars slidably received into one another with engaging and fitting flanges and web sections, said bars being in the form of main support bars and connecting bars, the connecting bars inserted into the main support bars for maintaining the same orientation of the approximate Σ-shape, with the free arms of the flanges of each main support bar having perforations, while the length of the associated arms of the flanges of the connecting bars are dimensioned for not covering said perforations, and with the perforations of the center web sections of the main support bars and connecting bars and of the free arms of the flanges of the main support bars being adjustable to apertures of further support elements for receiving fastening means, said components further including filling pieces in the assembly of said components, each filling piece constructed in the shape of an elongate rectangle in plan, each filling piece having a trapezoidal cross-section, a minor base surface with a width equal to the width of the center web section of each of the main support bars, and oblique faces with a width and an angle equal to the width and the angle respectively of the oblique web sections of the main support bars, each said filling piece secured to the center web section of a main support bar, said components further including fixing angles, each of which has two angle plates arranged mutually at right angles, one of said angle plates of a fixing angle being secured to the center web section of a main support bar, while the other angle plate is secured to a filling piece and its associated main support bar.

2. A combination of a set of components according to claim 1 wherein at each of the two corners on the bend line between the angle plates of each fixing angle an insertion aperture is provided so that one of the angle plates when inserted into the space between the center web section and the free arms of a main support bar is first slidable by one edge more deeply behind a free arm and then slidable with the opposite edge behind the opposite free arm prior to being secured to the main support bar.

3. A combination of a set of components according to claim 2 wherein each angle plate has a first slot extending along its median line at right angles to the other angle plate, each angle plate further including two elongated transverse apertures extending at right angles from said first slot, of which apertures the length and distance between their center lines is equal to the distance between two perforations in one of the main support bars and which conjointly with the slot form a U-shape, while the first slot extends slightly beyond each transverse aperture.

4. The combination of a set of components according to claim 3, wherein a second slot is provided staggered with and parallel to the first slot.

5. A combination of a set of components for forming a load-bearing framework comprising approximately Σ-shaped bars, each of which has a flat center web section being provided with perforations for receiving connecting means, oblique web sections enclosing an angle between 120° and 150° with the ends of said flat center web section and connecting arms of U-shaped flanges, the bars slidably receiving one another with engaging and fitting flanges and web section, said bars being in the form of main support bars and connecting bars, the connecting bars received in the main support bars for maintaining the same orientation of the approximate Σ-shape, with the free arms of the flanges of each main support bar having perforations, while the length of the associated arms of the flanges of the connecting bars are dimensioned for not covering said perforations, and the perforations of the center web sections of the main support bars and connecting bars and of the free arms of the flanges of the main support bars are adjustable to apertures of further support elements for inserting fastening means, said components further including filling pieces in the assembly of said components, each filling piece constructed in the shape of an elongated rectangle in plan, each of which filling piece has a trapezoidal cross-section, having a minor base surface equal to the width of the center web section of each of the main support and connecting bars, and oblique faces with a width and an angle equal to the width and to the angle respectively of the oblique web sections of the bars, each said filling piece secured to the center web section of a main support bar, said components further including angle elements, each angle element having a hole plate with three series of perforations which correspond to the three series of perforations in the main support bars in their mutual separation, said angle elements being connected to the main support bars, and each angle element further including a connecting plate arranged at a predetermined angle to the hole plate.

6. The combination of a set of components according to claim 5 wherein a slot is made in the median of the three series of perforations of the hole plate.

7. The combination of a set of components according to claim 6 wherein the angle element connecting plate has a raised center web on a side remote from the hole plate, and an oblique surface on each side of said web, and is positioned to fit against the center web section and the oblique web sections of the connecting and main support bars such that a slot is made in the raised center web of the angle element connecting plate.

* * * * *